United States Patent
Trivits

(10) Patent No.: US 6,416,112 B1
(45) Date of Patent: Jul. 9, 2002

(54) PROTECTIVE SHIELD FOR OFF-ROAD VEHICLES

(75) Inventor: Charles R. Trivits, Greenwood, DE (US)

(73) Assignee: Equipment Shield, a division of Trivits Companies, LLC., Greenwood, DE (US)

( * ) Notice: Subject to any disclaimer, the term of this patent is extended or adjusted under 35 U.S.C. 154(b) by 0 days.

(21) Appl. No.: 09/631,416

(22) Filed: Aug. 3, 2000

(51) Int. Cl.$^7$ ............................... B60J 1/00; B60J 5/00
(52) U.S. Cl. ......................................... 296/136; 296/50
(58) Field of Search .................. 296/50, 136, 57.1; 280/770; 180/6.2

(56) References Cited

U.S. PATENT DOCUMENTS

| | | | |
|---|---|---|---|
| 3,779,592 A | | 12/1973 | Golze et al. |
| 3,827,740 A | | 8/1974 | Golze et al. |
| 4,055,262 A | | 10/1977 | Bauer et al. |
| 4,068,876 A | | 1/1978 | Muellner |
| 4,235,466 A | | 11/1980 | Mandrik |
| 4,444,818 A | | 4/1984 | Tominaga et al. |
| 4,673,054 A | | 6/1987 | Burke et al. |
| 4,762,352 A | | 8/1988 | Enomoto |
| RE32,819 E | | 1/1989 | Waugh |
| 4,968,084 A | * | 11/1990 | Asher et al. |
| 5,005,887 A | | 4/1991 | Kelman |
| 5,029,918 A | | 7/1991 | Albright et al. |
| 5,044,688 A | * | 9/1991 | Jacobson |
| 5,131,702 A | | 7/1992 | Matthyse et al. |
| 5,154,462 A | | 10/1992 | Carpenter |
| 5,536,540 A | | 7/1996 | Borys et al. |
| 5,577,876 A | | 11/1996 | Haeder et al. |
| 5,605,369 A | * | 2/1997 | Ruiz |
| 5,711,391 A | * | 1/1998 | Brandt et al. |
| 5,788,899 A | | 8/1998 | Branham |
| 5,794,805 A | | 8/1998 | Branham |
| 5,931,522 A | * | 8/1999 | Roskey |
| 5,984,401 A | * | 11/1999 | Hannah |
| 5,988,776 A | | 11/1999 | Zurn |
| 6,016,584 A | | 1/2000 | Melroe |
| 6,070,908 A | * | 6/2000 | Skrzypchak |
| 6,152,487 A | * | 11/2000 | Crick |

* cited by examiner

*Primary Examiner*—Joseph D. Pape
*Assistant Examiner*—Scott Carpenter
(74) *Attorney, Agent, or Firm*—Dechert; Teresa O. Bittenbender

(57) ABSTRACT

A protective shield for use on skid steer loaders and other construction vehicles. The protective shield is composed of metal and functions to protect the tailgate and rear sides of a skid steer loader from dents and abrasions. More particularly, the protective shield is made of a diamond plate metal tailgate panel, which is rotationally molded to define the lower rear door panel, and two diamond plate metal side panels of substantially equal shape for protecting the left and right vertical upright members of the skid steer loader in the area between the rear door and the wheel wells of the skid steer loader.

11 Claims, 6 Drawing Sheets

PROTECTIVE SHIELD FOR OFF-ROAD VEHICLES

FIELD OF INVENTION

The present invention relates generally to the creation and use of metal plates as shields for off-road vehicles and, more particularly, to shields for skid steers.

BACKGROUND OF THE INVENTION

Skid steer loaders, also known as uniloaders, are highly compact off-road vehicles that are steered by driving the wheels on one side of the vehicle at a different speed, in an different direction, or both at a different speed and in a different direction from the wheels on the other side of the vehicle. Because of their compact nature, skid steer loaders operate in environments in which they are required to negotiate around obstacles such as trees and tree stumps, which are likely to cause damage to the skid steer upon impact. Most of the abuse absorbed by skid steers loaders during normal operation is on the rear portion of the vehicle.

Operators in the past have mounted protective wooden strips on the rear portion of the vehicle for protection against impacts. These wooden strips are unsightly and relatively ineffective. Other proposed solutions, such as the structure disclosed in U.S. Pat. No. 5,029,918, have used a rear door and an elastomer bumper as protective devices. These proposals are ineffective, however, because they only protect a small portion of the rear end of the vehicle and do not protect the entire rear and lateral sides. Still other proposals are disclosed in the patents discussed below.

U.S. Pat. Nos. 5,788,899 and 5,794,805 are directed to double-walled light housings mounting front and rear lights that serve as a fuel tank assembly and as bumpers protecting the upper portion of the vehicle frame. The housings are composed of plastic and define a plurality of horizontally disposed light chambers open away from the frame whereby lights can be selectively mounted in appropriate light chambers. The storage containers are composed of non-metallic parts.

U.S. Pat. No. 4,235,466 is directed to a body-side protective molding system that is secured to the vertical metal side panels of an automobile body. The body protective system includes side protective moldings, each made of a roll-formed metallic carrier strip. The strip is bonded at its undersurface to a layer of adhesive tape comprising a two-sided, stick-on neoprene tape. The side of the adhesive tape opposite the carrier strip is used to attach the carrier strip to a surface portion of the automobile body. The metal carrier strip supports a plastic insert that is bonded or mechanically affixed. This system has the disadvantage of being difficult to install and not suitable for off-road vehicles that incur a great deal of damage over a wide surface area on the rear of the vehicle.

To overcome the shortcomings of conventional skid steer loaders, a new skid steer loader is provided having a visually attractive shield of high structural integrity that covers the entire rear and lateral side portions of the vehicle and protects the vehicle from impact and abrasions. An object of the present invention is to overcome the disadvantages of the prior art by providing a skid steer loader construction having a protective shield. Another object is to provide a protective shield having a diamond plate metal tailgate panel that is rotationally molded to define the lower rear door panel, and two diamond plate metal side panels of substantially equal shape for protecting the left and right vertical upright members of the skid steer loader in the area between the rear door and the wheel wells.

BRIEF SUMMARY OF THE INVENTION

To achieve these and other objects, and in view of its purposes, the present invention provides a protective shield (aka bumper beam) for use on skid steer loaders. The shield includes left and right laterally spaced side panel members having laterally facing surfaces and a rear door having a rearwardly facing surface. The protective shield (or bumper beam) is mounted to the rear of the skid steer loader and further includes a diamond plate metal tailgate panel that is rotationally molded to define the lower rear door panel, and two diamond plate metal side panels of substantially equal shape for protecting the left and right vertical upright members of the skid steer loader in the area between the rear door and the wheel wells.

The present invention also provides a kit suitable for installation of a protective shield on a skid steer loader which includes a diamond plate metal tailgate panel that is rotationally molded to conform to the first and second elements of the rear door and thus define the lower rear door panel, two diamond plate metal side panels of substantially equal shape for protecting the left and right vertical upright members of the skid steer loader in the area between the rear door and the wheel wells, at least four bolts of a size and dimension suitable for securing the tailgate panel to the skid steer loader plate, and at least eight side bolts of a size and dimension suitable for securing the side panels onto the skid steer using four bolts for each side panel. Alternatively, instead of bolts, the kit may include adhesive suitable for mounting the tailgate panel onto the rear door of the skid steer loader.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

The protective shield (aka bumper beam) of the present invention wraps around and protects the rear portion, including the rear door of skid steer loaders and other construction vehicles. The protective shield offers several advantageous over the prior art. First, the protective shield of the present invention protects a large surface area of the rear portion of the vehicle. In addition, the inventive shield is easy to install, is replaceable, and enhances the overall appearance of the vehicle.

Figure 1:
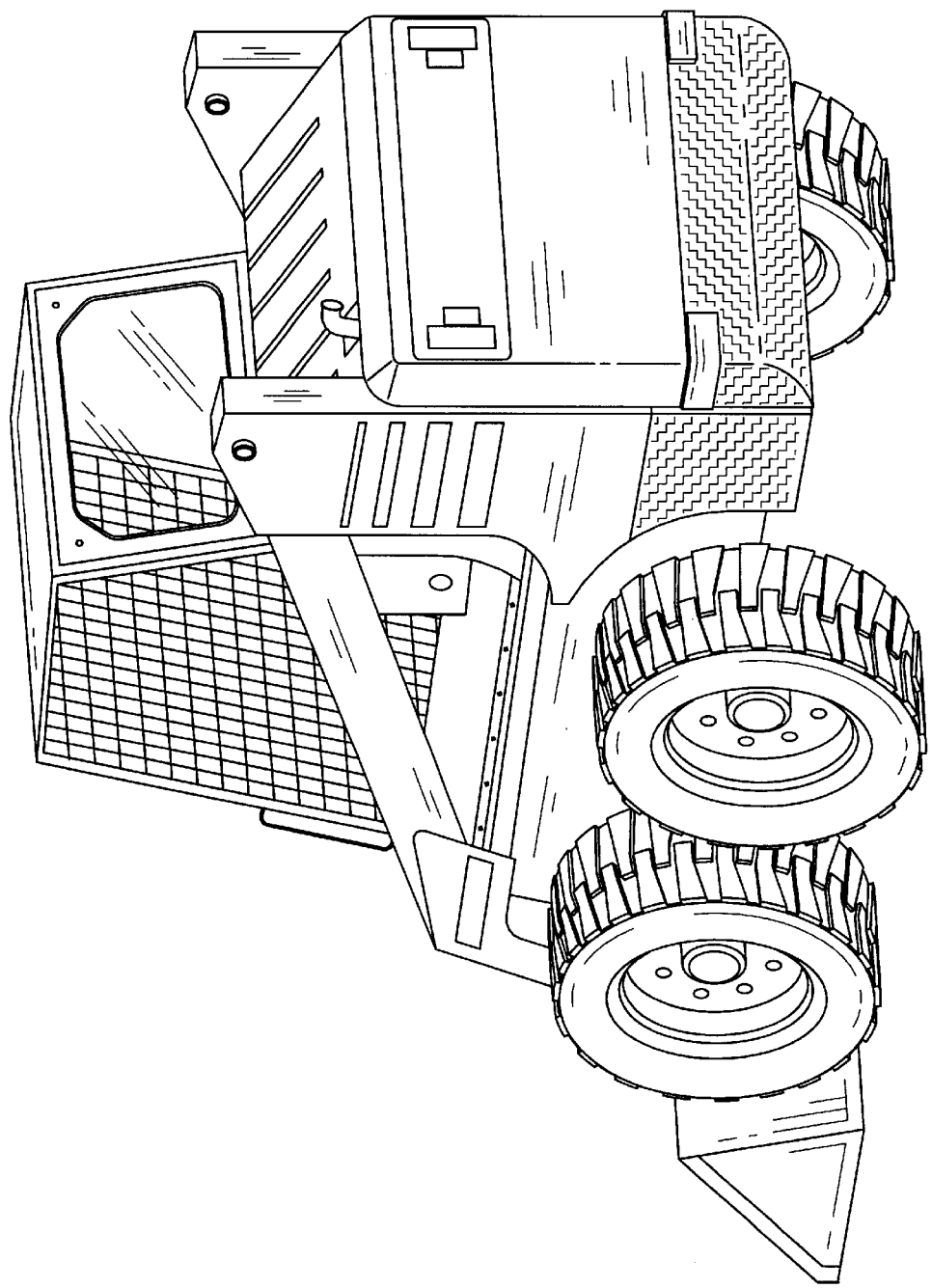
FIG. 1 is a prospective view of a skid steer loader which combines a conventional bumper with the protective shield in accordance with the present invention.
Figure 2:
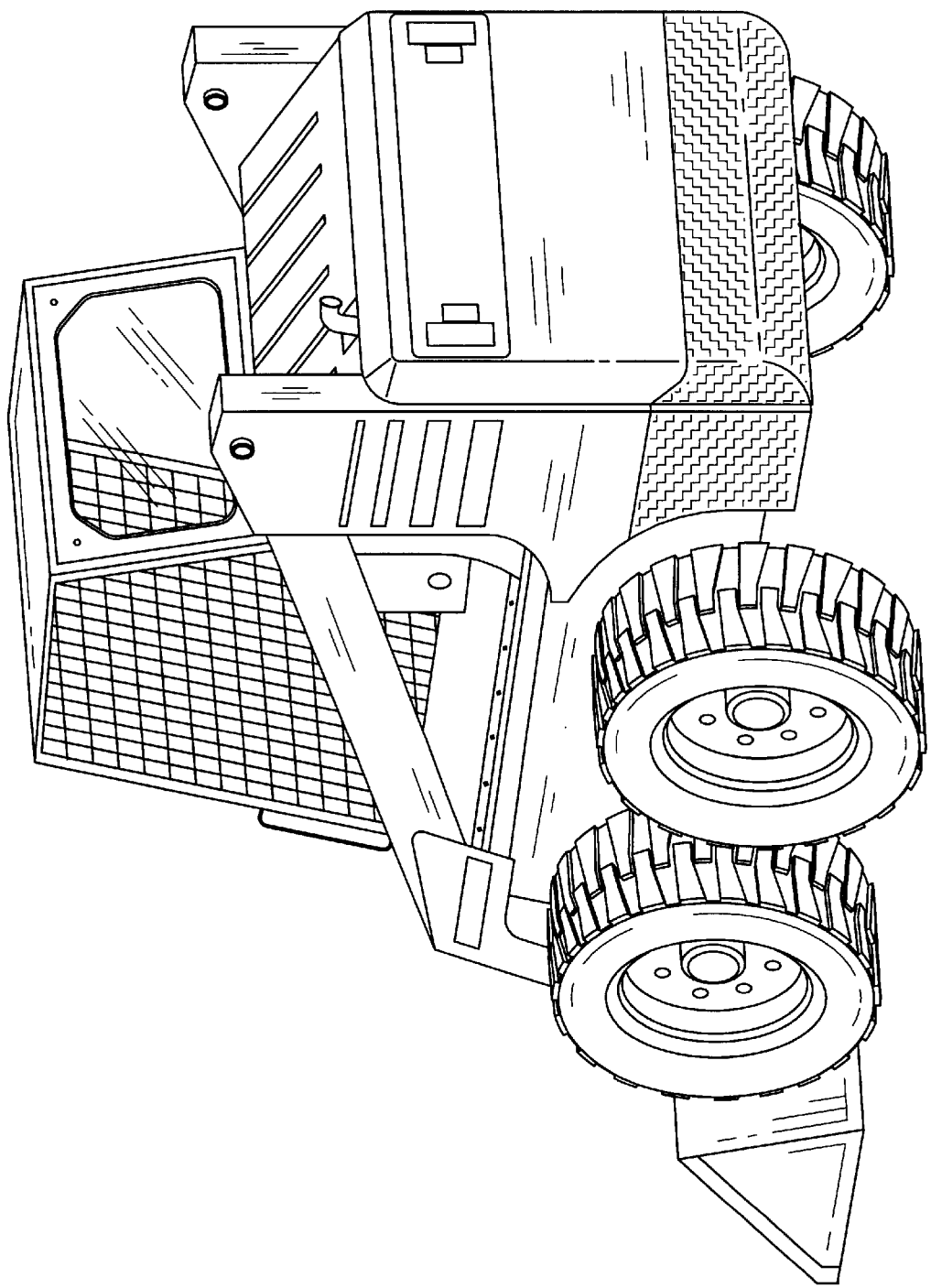
FIG. 2 is a prospective view of a skid steer loader having the protective shield of the present invention.

Referring to the drawing and particularly to FIGS. 1 and 2, a representative view of a skid steer loader incorporating the principles of the instant invention can best be seen. Any left and right references are used as a matter of convenience and are determined by standing at the rear of the skid steer loader and facing the forward end in the normal (forward) direction of travel. A skid steer loader 10 comprises a wheeled vehicle having a top, a bottom and a main frame 12, which is formed by left and right laterally spaced beams or side portions 14. Each side portion 14, has an upright member 30, 32 at its rear. Two pairs of opposing front and rear wheels 16, 18 are rotatably supported by the main frame 12 and are used for over-the-ground travel. An operator's compartment or cab 20 is located forward of a rear door 24 disposed between the side portions 14.

As is conventional in such vehicles, the wheels 16, 18 of the skid steer loader 10 are rotatably driven by hydraulic motors operatively powered from an engine located near the rear of the vehicle and supported by the main frame 12. Steering of the skid steer loader 10 is accomplished by differential driving of the opposing left and right side wheels 16, 18 in a conventional manner through the use of a pair of control sticks (not shown). The main frame 12 defines the operator's cab 20 in which the operator sits to maneuver the skid steer loader 10. A work implement, shown in FIGS. 1 and 2 as a bucket 22, is powered in a conventional manner by hydraulic cylinders (not shown) to locate the work implement immediately forward of the operator's cab 20.

The rear door (aka rear of the vehicle) 24 extends between the upright members 30, 32 and encloses a lower rear portion of the engine compartment. The rear has a first element that extends substantially vertically and a second element that extends from the first element toward the bottom of the skid steer loader at an angle less than 180°. The rear door 24 is mounted by a hinge to one of the upright members 30, 32 and is secured to the other upright member 30, 32 by a latch mechanism (not shown). A hood 34 is mounted at its top edge to the main fame 12. A pair of taillights 36, 38 are mounted on the rear portion of the vehicle. An elastomer bumper 28 as described in U.S. Pat. No. 5,029,918 is mounted to the left and right lower edges of the rear door 24 as seen in FIG. 1. The protective shield or protective bumper beam 26 of the present invention is located on the lower portion and on the lateral sides of the rear door 24, and on the left and right side panels 40 of the vehicle. The bumper beam wraps around the first and second elements of the rear of the skid steer loader.

The rear and the side panels of the protective shield 26 are manufactured from metal, preferably diamond aluminum plate. In preferred embodiments of the present invention, the diamond plate has a thickness in the range of 3.175 mm (⅛ inch) to 4.763 mm (³⁄₁₆ inch). Although a thicker plate is possible, thicker plates needlessly increase the cost of the protective shield 26. Thinner plates provide insufficient protection against damage to skid steer loader 10.

Figure 3:
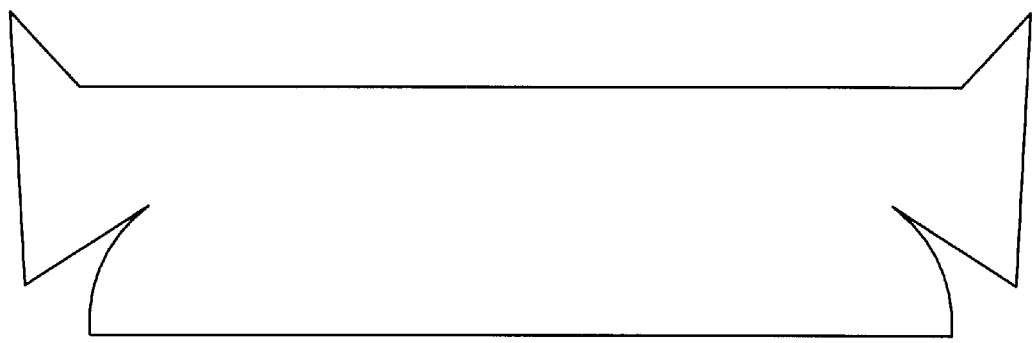
FIG. 3 is a tailgate panel shield according to the present invention.
Figure 4:
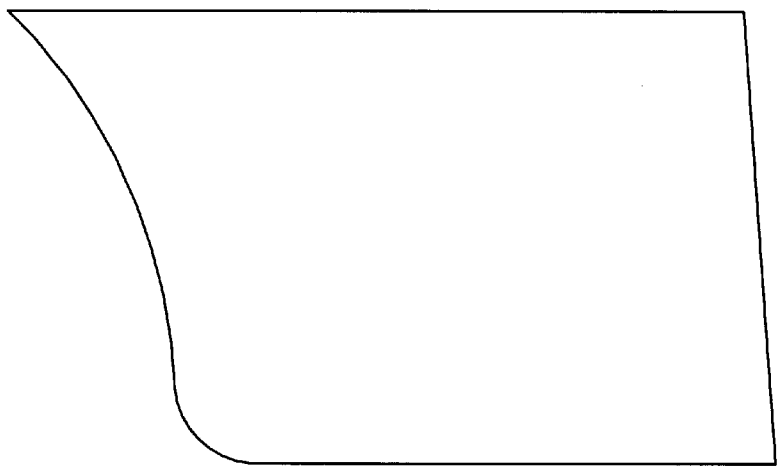
FIG. 4 is a left side panel shield according to the present invention.

FIGS. 3 and 4 depict a first embodiment of the protective shield 26 of the present invention. The protective shield 26 consists primarily of a tailgate rear panel 26a, as shown in FIG. 3, and two identical side panels 26b of the shape shown in FIG. 4. The rear panel 26a has a top 110 and a base 100. The top 110 has left and right slanted edges 116, 120 that end at left and right points 118, 122, respectively. The base 100 has left and right convex sections 104, 108. The left edge 114 begins at the top left point 118 and continues down vertically to a bottom left point 124 before forming a left side-angled edge 102. Similarly, the right edge 112 begins at the top right point 122 and continues down vertically to a bottom right point 126 before forming a right side-angled edge 106. Left convex section 104 meets left side-angled edge 102 at a junction 128; similarly, right convex section 108 meets right side-angled edge 106 at a junction 130.

Upon installation of the rear panel 26a onto the vehicle, the left convex section 104 is welded to the left side-angled edge 102, and the right convex section 108 is welded to the right side-angled edge 106 using conventional welding procedures well known to those of skill in the art. The rear panel 26a is centered on the rear door 24 of the vehicle such that the base 100 is flush with the bottom edge of the rear door 24 and the left edge 114 and right edge 112 are flush with the left and right edges of the rear door 24, respectively. Junctions 128, 130 permit the rear panel 26a to bend along an imaginary horizontal line connecting junctions 128, 130 and, therefore, to conform to the lower front portion of rear door 24. Junctions 128, 130 also permit the rear panel 26a to bend along an imaginary vertical line extending through the junctions 128, 130 and, therefore, to conform to the sides of rear door 24. It may be necessary to tap the corners of the rear shield 26a with a rubber mallet to facilitate application of the shield 26 to the vehicle.

The rear panel 26a of shield 26 is then secured in place using fasteners disposed generally in each corner of the rear panel 26a using methods well known to those of skill in the art. Any one of a number of types of conventional fasteners are suitable; bolts are preferred. The number of bolts used to fasten the rear panel 26a of the protective shield 26 to the skid steer loader 10 is not critical. In preferred embodiments, however, at least four bolts are used to fasten the shield 26 onto the vehicle. The bolts should be of sufficient size to ensure adequate fastening of the rear panel 26a to the vehicle. In preferred embodiments, the bolts are about 6.3 to 12.7 mm (¼ to ½ inch) in size. In a most preferred embodiment, the bolts are about 8 mm (⁵⁄₁₆ inch) in size. An elastomer bumper 28 may be applied directly on top of the shield 26 as shown in FIG. 1.

Depicted in FIG. 4, the left and right side panels 26b are mirror images of one another. Each side panel 26b has a top 210, a base 212, a straight side 202, and a concave side 204. The concave side 204 extends from a pointed top edge 208 down in a generally vertical manner to a curved bottom edge 206. To install each side panel 26b, the base 212 is positioned such that it is flush with the bottom edge of one of the upright members 30, 32 of the vehicle with the concave side 204 of the side panel 26b facing the wheel well. A hole is drilled at each corner of the side panel 26b and in corresponding positions of the vehicle. The side panel 26b is secured into place using fasteners (e.g., bolts) that extend through each of the correspondingly positioned holes.

The number of bolts used to fasten each side panel 26b of the protective shield 26 to the skid steer loader 10 is not critical. In preferred embodiments, however, at least four bolts are used to fasten each side panel 26b to the vehicle. The bolts should be of sufficient size to ensure adequate fastening of the side panels 26b to the vehicle. In preferred embodiments, the bolts are about 8 mm (⁵⁄₁₆ inch) in size.

Each side panel 26b may be positioned flush with the wheel well. Alternatively, a small gap may intentionally be left between the side panels 26b and the wheel wells. Such a gap helps to prevent debris from prying the side panel 26b away from the vehicle upon contact.

Figure 5:
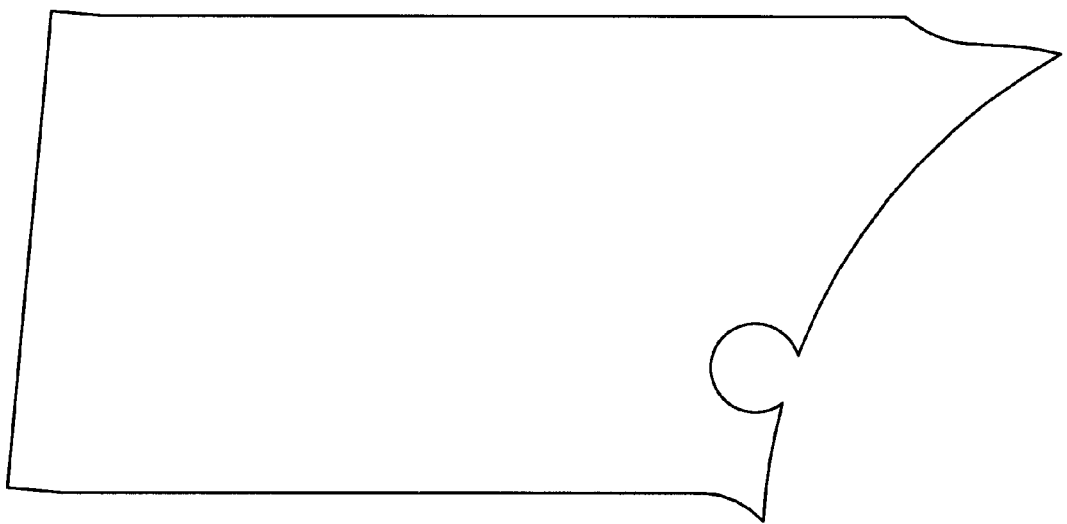
FIG. 5 is a right side panel shield according to the present invention.

FIG. 5 illustrates a second embodiment of the side panel 26b of the shield 26 of the present invention. As illustrated in FIG. 5, side panel 26b has an arc 214 cut into the concave side 204. Arc 214 is shaped to accommodate any protrusions of the vehicle that might otherwise prevent side panel 26b from being affixed to and lying flush against the vehicle. Other differences between the embodiments of the side panel 26b illustrated in FIGS. 4 and 5 include shape variations in side panel 26b adjacent curved bottom edge 206 and pointed top edge 208.

Figure 6:
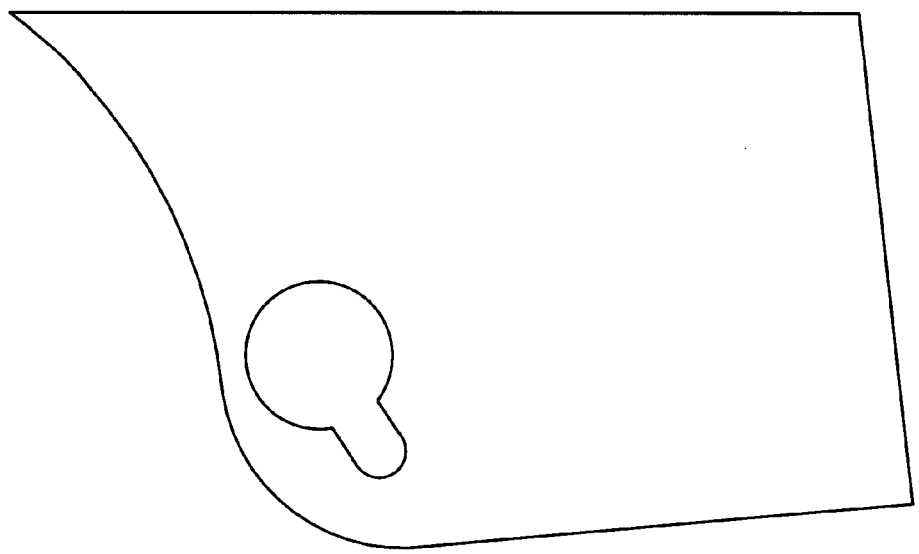
FIG. 6 is a relief-cut shield according to the present invention.

FIG. 6 illustrates a third embodiment of the side panel 26b of the shield 26 of the present invention. As illustrated in FIG. 6, side panel 26b has an opening 216. Opening 216 is designed to accommodate a preexisting feature of the vehicle that may protrude outwardly from the frame of the vehicle.

Figure 7:
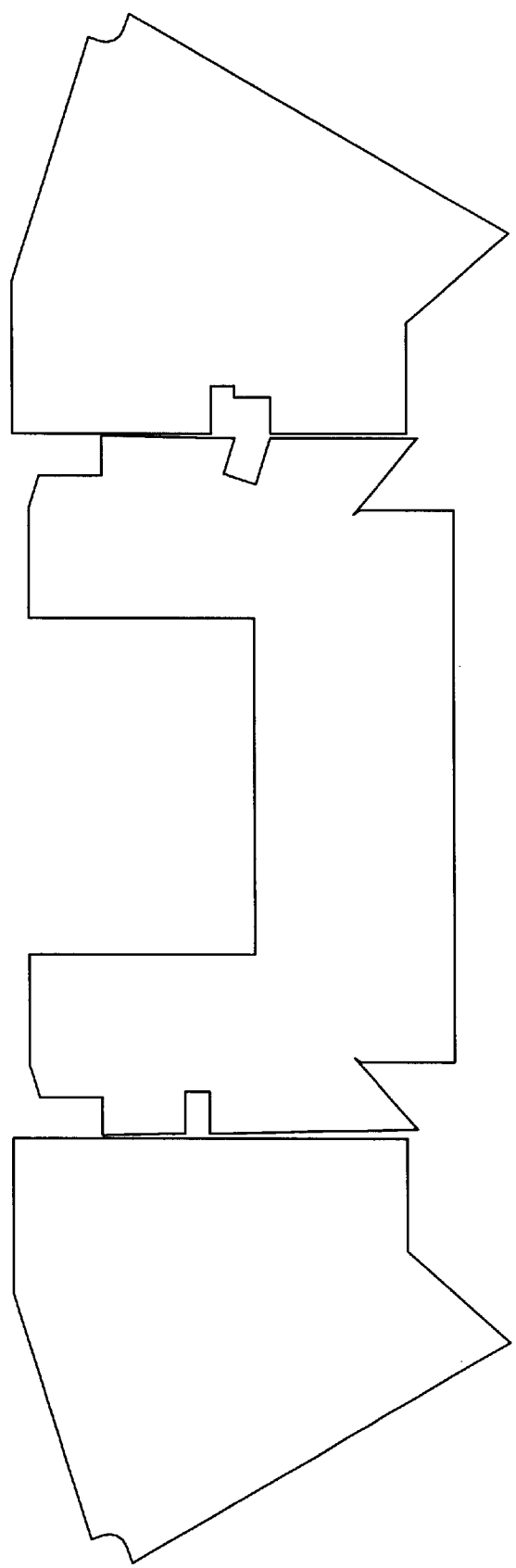
FIG. 7 is a protective shield according to the present invention.

FIG. 7 illustrates another embodiment of the shield 26 of the present invention. This embodiment is suitable for models of skid steer loaders 10 having a grill located on the rear door 24 of the vehicle. The tailgate or rear panel 26a has a top 710, a base 712, a left vertically projecting edge 714, and a right vertically projecting edge 716. In other words, the rear door of the skid steer loader extends laterally towards the left and right vertical upright members in an angle less than 180°. The bumper beam is rotationally molded to conform to the lateral extensions of the rear door. The left and right vertically projecting edges 714, 716 extend upwards perpendicularly from the base 712 such that a substantially rectangular or square cavity 715 is formed between the vertically projecting edges 714, 716. The cavity 715 is designed to accommodate a grill located on the rear door 24 of the vehicle.

The left vertically projecting edge 714 has a relief void 718 on the outer left side designed to accommodate a preexisting feature of the vehicle that may protrude outwardly from the rear door 24 of the vehicle (such as a latch). Similarly, the right vertically projecting edge 716 has a relief void 720 located on the outer right side designed to accommodate a preexisting feature of the vehicle that may protrude outwardly from the rear door 24 of the vehicle (such as a door hinge). A notch 730 is provided in the top left corner of the rear panel 26b to facilitate a protruding object of the vehicle (such as a door handle). A pair of grooves 740 are located on the left and right bottom corners of the base 712. The tops 722, 722' and the bottoms 724, 724' of the grooves are welded together before installation of the shield 26 onto the vehicle and are designed to rotationally conform the shield 26 to the rear door 24 of the vehicle.

The side panels 26b are of a substantially wing-like shape. The left and right side panels 26b have a relief cut arc 750 located in the upper left corner of each side panel 26b. The arcs 750 are designed to accommodate a protruding preexisting feature of the vehicle (such as a loading arm pin). Each side panel 26b has an inner edge 755, 755' and an outer edge 765, 765'. The inner edge 755' of the right side panel 26b has a relief cut void 762 that corresponds to the relief cut void 720 on the rear panel 26a. The relief cut void 762 is designed to accommodate a preexisting outwardly protruding object on the vehicle (such as a door hinge). To install the side panels 26b, the bases 764, 764' of the side panels 26b are positioned such that they are flush with the bottom edges of the upright members 30, 32 of the vehicle and such that the outer edges of the side panels 26b face the wheel well of the vehicle. A hole is drilled at each corner of the side panel 26b and in corresponding positions of the vehicle. The side panel 26b is secured in place using bolts that are extended through each of the correspondingly positioned holes.

Figure 8:
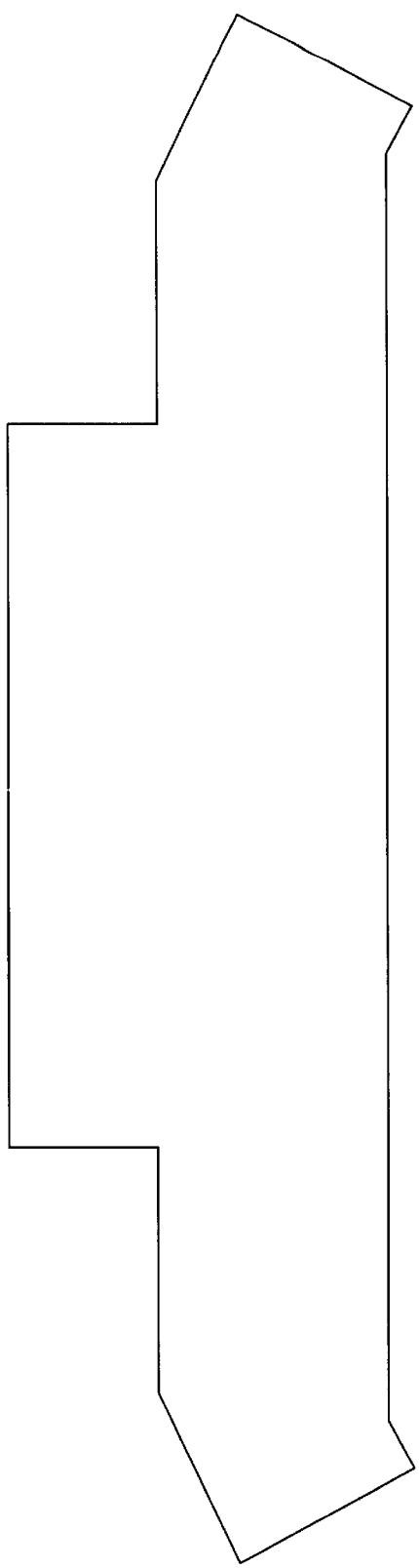
FIG. 8 is a top tailgate protective shield according to the present invention.
Figure 10:
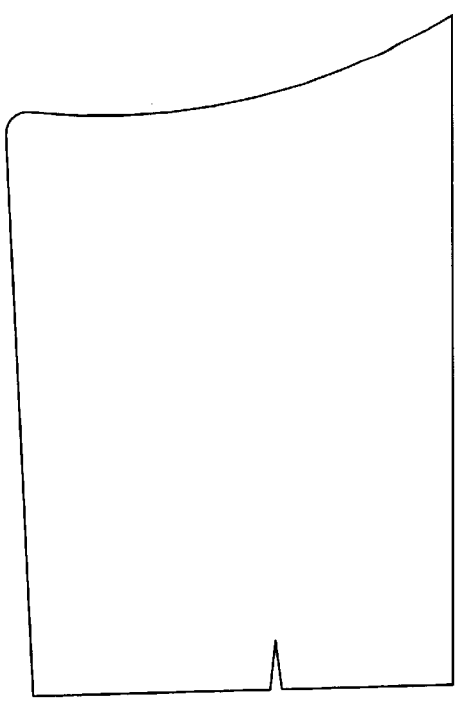
FIG. 10 is a right side panel protective shield according to the present invention.
Figure 9:
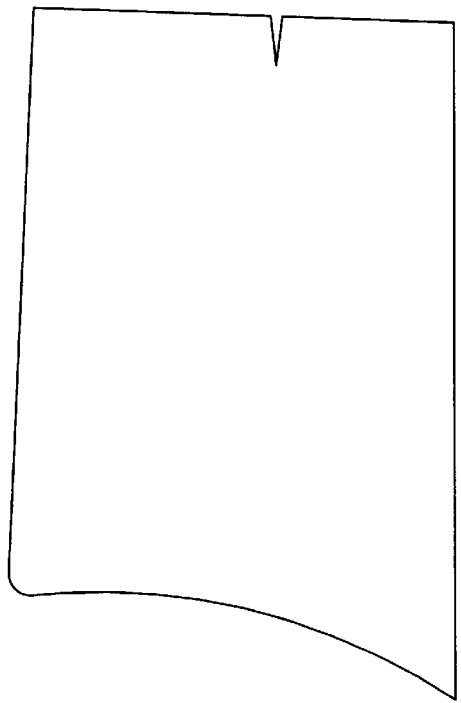
FIG. 9 is a left side panel protective shield according to the present invention.

FIGS. 8, 9, and 10 illustrate another embodiment of the present invention. The rear panel 26a of FIG. 8 has a substantially rectangular shaped body 810 defining the top 110, right edge 112, and left edge 114 of the rear panel 26a. The body 810 also has integral, one-piece, monolithic mirror image side edges 812, 812' projecting from the body 810. The projecting edges 812, 812' do not extend to the full width of the body 810. Rather, projecting edges 812, 812' extend from about the midpoint of the side edges 112, 114 of the body 810, forming a right angle to the side edges 112, 114.

Each projecting edge 812, 812' extends outward from side edges 112, 114 parallel to the base 100 of rear panel 26a before angling downward at top junction points 814, 814' and bottom junction points 816, 816' to the angled, flat faces 820, 820'. The top angled portions 822, 822' and the bottom angled portions 824, 824' form right angles with faces 820, 820'. This shape facilitates the use of an elastomer bumper 28 simultaneously with the protective shield 26 on the same vehicle as shown in FIG. 1.

The side panels 26b of FIGS. 9 and 10 each have a small notch 830 located on the straight sides 202 of the side panels 26b. The top and bottom edges of the notch 830 are welded together before installation of the shield 26 onto the vehicle and are designed to rotationally conform to the edges of the upright members 30, 32 of the vehicle on older skid steer models.

The present invention is suitable for use on all commercially available skid steers loaders including, but not limited to, all Bobcat, Case, Gehil, Mustang, and New Holland skid steer loaders. Specific example vehicles include the Bobcat 700 series models, Bobcat 800 series models, and Case models 1840 and 1845.

Some skid steers, such as the Case 1840 or 1845 models, have fuel tanks located immediately adjacent to the upright members 30, 32 of the vehicle. This location of the fuel tanks necessitates an alternative installation process of the protective shield 26 of the present invention. Each side panel 26b is glued onto the vehicle using 3M 1099 brand adhesive (available from Minnesota Mining & Manufacturing Co.). Other adhesives have proven to be ineffective for purposes of the present invention. The entire surface of the protective shield 26 and the corresponding surface area of the vehicle are first sanded using coarse grade sandpaper until bare metal is exposed and visible and then cleaned with any brand of denatured alcohol using conventional application methods known to one of skill in the art. Following application of the denatured alcohol, the adhesive is applied over the entire sanded surface area of the protective shield 26 and the corresponding area on the vehicle. The adhesive is allowed to sit for approximately 10 minutes. The protective shield 26 is then applied to the vehicle and secured overnight by clamps such as spring clamps or "C-clamps." The type of clamp used is not critical to the present invention and need only be of sufficient size and shape to ensure adequate contact of the protective shield 26 to the vehicle.

For application of the rear panel 26a of the shield 26 to the rear door 24, two bottom bolts are first removed from the grill. The rear panel 26a is centered on the rear door 24 of the vehicle such that the base 100 is flush with the bottom edge of the rear door 24. Two holes are marked and drilled corresponding to the location of the bolts from the oil cooler of the vehicle. The rear panel 26a is then secured in place using bolts of suitable size and using methods well known to those of skill in the art. At least two holes are then drilled in the upper portion of the rear panel 26a and rear door 24 of the vehicle. These holes are then used to bolt rear panel 26a to the vehicle using methods well known to those of skill in the art.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A protective shield for use on skid steer loaders having a top, a bottom and a rear having a first element that extends substantially vertically and a second element that extends from the first element toward the bottom of the skid steer loader at an angle less than 180°;

and left and right vertical upright members defining wheel wells, the shield comprising:

a diamond plate metal protective bumper beam wrapping around the first and second elements of the rear of the skid steer loader; and two diamond plate metal side panels of substantially equal shape conforming to the lower portion of the left and right vertical upright members of the skid steer loader in the area between the rear and the wheel wells of the skid steer loader, wherein said protective shield is adapted for use on a skid steer loader.

2. The protective shield according to claim 1 wherein the diamond plate metal is aluminum.

3. The protective shield according to claim 1 wherein the diamond plate metal is in the thickness range of one-eighth inch to three-sixteenth inch.

4. The protective shield of claim 1 wherein the rear door of the skid steer loader extends laterally towards the left and right vertical upright members in an angle less than 180° and wherein the bumper beam is rotationally molded to conform to the lateral extensions of the rear door.

5. A skid steer loader comprising:

a top and a bottom;

a frame including a left beam having a left upright member at the rear of the left beam and a first laterally facing surface, and a right beam laterally spaced from the left beam and having a right upright member at the rear of the right beam and a second laterally facing surface;

a rear door extending between the left and right upright members, said rear door having a first element that extends substantially vertically and a second element that extends from the first element toward the bottom of the skid steer loader at an angle less than less than 180°;

two pairs of opposing left and right side wheels rotatably supported by the frame; a protective diamond plate metal shield mounted to the skid steer loader and having:

(a) a tailgate panel rotationally molded to conform to the first and second elements of the rear door, and (b) two side panels of substantially equal shape conforming to the lower portion of the left and right upright members in the area between the rear door and the wheels.

6. A skid steer loader of claim 5 wherein said rear door extends laterally towards the left and right vertical upright members in an angle less than 80° and wherein the bumper beam is rotationally molded to conform to the lateral extensions of the rear door.

7. The skid steer loader of claim 5 wherein the diamond plate metal protective shield is comprised of aluminum.

8. The skid steer loader of claim 5 wherein the diamond plate metal protective shield is in the thickness range of one-eighth inch to three-sixteenth inch.

9. The skid steer loader of claim 5 further comprising an elastomer bumper mounted on the rear door.

10. A kit suitable for installation of a protective bumper beam on a skid steer loader having a top, a bottom and a rear having a first element that extends substantially vertically and a second element that extends from few first element toward the bottom of the skid steer loader at an angle less than 180°;

and left and right vertical upright members defining wheel wells, the kit comprising:

a diamond plate metal protective bumper beam wrapping around the first and second elements of the rear of the skid steer loader two diamond plate metal side panels of substantially equal shape conforming to the left and right vertical upright members of the skid steer loader in the area between the rear and the wheel wells of the skid steer loader;

at least four bolts of a size and dimension suitable for securing the tailgate panel to the skid steer loader; and at least eight side bolts of a size and dimension suitable for securing the side panels on the skid steer loader using four bolts for each side panel.

11. A protective shield for use on skid steer loaders having a top, a bottom and a rear having a first element that extends substantially vertically and a second element that extends from the first element toward the bottom of the skid steer loader at an angle less than 180°; and left and right vertical upright members defining wheel wells, the shield comprising:

a diamond plate metal protective bumper beam wrapping around the first and second elements of the rear of the skid steer loader; and two diamond plate metal side panels of substantially equal shape conforming to the left and right vertical upright members of the skid steer loader in the area between the rear and the wheel wells of the skid steer loader;

at least eight bolts of a size and thickness suitable for securing the side panels to the skid steer loader using four bolts for each side panel; and adhesive suitable for mounting the tailgate panel onto the rear of the skid steer loader.

* * * * *